United States Patent [19]

Vavra et al.

[11] Patent Number: 5,303,731
[45] Date of Patent: Apr. 19, 1994

[54] LIQUID FLOW CONTROLLER

[75] Inventors: Randall J. Vavra, Orange; Michael J. Doyle, Villa Park; Kim N. Vu, Yorba Linda, all of Calif.

[73] Assignee: Unit Instruments, Inc., Yorba Linda, Calif.

[21] Appl. No.: 906,922

[22] Filed: Jun. 30, 1992

[51] Int. Cl.$^5$ .............................................. G05D 7/06
[52] U.S. Cl. .................... 137/468; 137/486; 137/487.5
[58] Field of Search ............. 137/467.5, 468, 486, 137/487.5

[56] References Cited

U.S. PATENT DOCUMENTS

| | | | |
|---|---|---|---|
| 2,658,522 | 11/1953 | Coberly | 137/468 |
| 2,662,547 | 12/1953 | Comeau | 137/468 |
| 2,675,020 | 4/1954 | Breitwieser | 137/468 |
| 4,947,889 | 8/1990 | Ishikawa et al. | 137/486 |
| 5,062,446 | 11/1991 | Anderson | 137/468 |

Primary Examiner—Robert G. Nilson
Attorney, Agent, or Firm—Fitch, Even, Tabin & Flannery

[57] ABSTRACT

A liquid flow controller for metering a flow of liquid has an inlet to receive the liquid. The inlet feeds the liquid to a high resistance liquid flow path across which a pressure drop arises. A pressure sensor measures the liquid flow induced pressure drop and generates pressure drop signal which is fed to an electronic circuit. A temperature sensor is connected to the high resistance liquid flow path and generates a temperature signal which is also fed to the electronic circuit. The circuit energizes a viscosity-normalized liquid flow signal, which is compared to a set point signal to generate an error signal. A valve connected downstream of the high resistance liquid flow path to control the flow of liquid is driven by the error signal and thereby controls the flow of liquid.

10 Claims, 5 Drawing Sheets

LIQUID FLOW CONTROLLER

BACKGROUND OF THE INVENTION

The invention relates in general to a liquid flow controller which controls a flow of liquid by measuring a pressure drop. More particularly, the invention relates to a liquid flow controller which is relatively insensitive to temperature dependent changes in the viscosity of the liquid that may perturb the sensed pressure drop.

Semiconductor integrated circuits are fabricated by using epitaxy, chemical vapor deposition, plasma etching, and the like in processing chambers. In the course of a number of these wafer fabrication processes it is often necessary to employ reactant materials that normally are liquid at room temperature and atmospheric pressure. For instance, some epitaxial deposition processes employ silicon tetrachloride (SiCl4) as a silicon source. Silicon tetrachloride is liquid at standard temperature and pressure. It may be converted to vapor in a bubbler or similar apparatus.

In a bubbler, a flow of a relatively non-reactive gas, such as dry nitrogen or argon, is directed beneath the surface of a quantity of reactant liquid, such as silicon tetrachloride. A portion of the liquid silicon tetrachloride is vaporized and entrained in the gas stream as silicon tetrachloride vapor and the accompanying gas-vapor mixture is then metered through a conventional mass flow controller. One of the problems with such conventional metering is that it is often difficult to determine precisely the amount of vapor which is entrained in the gas-vapor stream and thus the amount of vapor flowing into the process chamber. Hence, it is difficult to meter accurately the amount of liquid reactant flowing into the process chamber.

Another reactant that suffers from similar drawbacks is tetraethoxysilane (TEOS), which is sometimes used in low temperature deposited oxide processes. TEOS, similarly, may be introduced into the process chamber in which it is employed via a bubbler.

Attempts have also been made to use thermal liquid flow controller systems that are akin to the thermal mass flow controller systems employed for the metering of gases and vapors in the semiconductor industry. Such thermal liquid flow controller systems typically allow a liquid to flow through a conduit. The conduit has an upstream temperature sensing element and a downstream temperature sensing element in contact with it. A portion of the conduit is heated and the difference in temperature between the upstream and downstream sensing elements is reflected as a signal that is a flow rate indicator. However, a number of problems have been encountered with such thermal liquid flow controllers. The sensing tubes in such controllers are unstable. They become clogged with crystalline deposits and are rendered inoperable. The sensing tubes also, because of their associated heaters, tend to vaporize the liquid, trapping bubbles in the tube and causing inaccurate flow reading.

Other types of liquid flow metering systems employ differential pressure producers to produce a pressure drop caused by the stream of moving liquid. The pressure drop is then measured and is used to develop a signal indicative of the liquid flow. One of the drawbacks associated with such conventional differential pressure flow meters is that, in particular for use in liquids, the viscosity of the liquid may change as the temperature of the liquid changes. Since the flow rate is a function of the pressure drop as well as the viscosity of the fluid, determinations of the flow rate made solely from the pressure drop alone may prove to be inaccurate if the liquid has a viscosity other than the viscosity at which the instrument has been calibrated. In most applications, however, such changes in viscosity do not result in significant difficulties. The demands of semiconductor processing are such, however, that it is necessary to meter precise quantities of the reactants into the process chamber because failure to do so may result in the production of unacceptable wafers. For instance, changes in the amount of various reactants may result in changes in the amount of doping in the wafer or in in the thickness of deposited oxides, deposited nitrides and the like. As the design rules for integrated circuits have smaller and smaller dimensions, such relatively small changes in reactant flows may result in the production of unacceptable integrated circuits.

What is needed is a liquid flow controller which can precisely meter a known mass of reactant on a mass per unit time basis and can deliver the reactant in a vapor state to the process chamber.

SUMMARY OF THE INVENTION

A liquid flow controller embodying the present invention includes an inlet for receiving a flow of liquid such as a semiconductor reactant liquid, for instance, silicon tetrachloride or tetraethoxysilane. The liquid flow controller includes a base block having a high resistance liquid flow path connected to it which comprises a helically wound small bore tube across which a pressure drop is developed resulting from the liquid flow. The bore of the tube is small enough that, at the pressure drop across the liquid flow path, the liquid flow is laminar. The flow of liquid is returned to a channel in the base block and an electromagnetic valve is connected to the channel downstream for modulating the flow of fluid through the block. A pressure transducer is connected across the high resistance liquid flow path to measure the pressure drop thereacross. The pressure transducer develops a pressure transducer signal or pressure drop signal which is fed to other parts of an electronic circuit for processing. A thermistor for determining effectively the viscosity of the liquid in the fluid flow path is placed in good thermally conductive relationship with the tube and is energized in a bridge circuit by the pressure drop signal. Changes in the temperature of the liquid in the tube are reflected by changes in temperature of the thermistor causing shifts in the bridge voltage which are amplified and fed to a differential amplifier. The differential amplifier also receives the pressure drop signal and produces a compensated or viscosity normalized flow signal which is fed to a linearizing circuit. The linearizing circuit comprises a plurality of linear segment generators with break points selected at the 25 percent, 50 percent and 75 percent flow levels. A linearized flow signal is then fed to a valve driver circuit which drives a solenoid of the electromagnetic valve to control the flow of fluid therethrough.

It may be appreciated that the effective gain of the bridge in which the thermistor is located is responsive to the liquid pressure drop signal because the bridge is energized by an amplifier driven from the pressure drop signal. In addition, the thermistor signal, by allowing the pressure drop signal to be compensated for, allows accurate metering of the liquid flow despite changes in the viscosity of the fluid resulting from changes in the temperature of the fluid. In order to minimize external or ambient temperature changes from affecting the viscosity reading, an insulating material such as a conventional fibrous insulating blanket is positioned around the high resistance flow path and the thermistor to thermally isolate the thermistor from all thermal influences other than the temperature of the liquid.

It is a principal aspect of the present invention to provide a liquid flow controller for metering a flow of reactant liquid.

It is another aspect of the invention to provide a highly accurate liquid flow controller which meters liquid flow by measuring a pressure drop across a high resistance liquid flow path.

It is a still further aspect of the present invention to provide a liquid flow controller for which temperature induced shifts in viscosity are compensated.

Other aspects of the present invention will become apparent to one of ordinary skill in the art upon a perusal of the specification and claims in light of the accompanying drawings.

DETAILED DESCRIPTION OF THE PREFERRED EMBODIMENT

Figure 1:
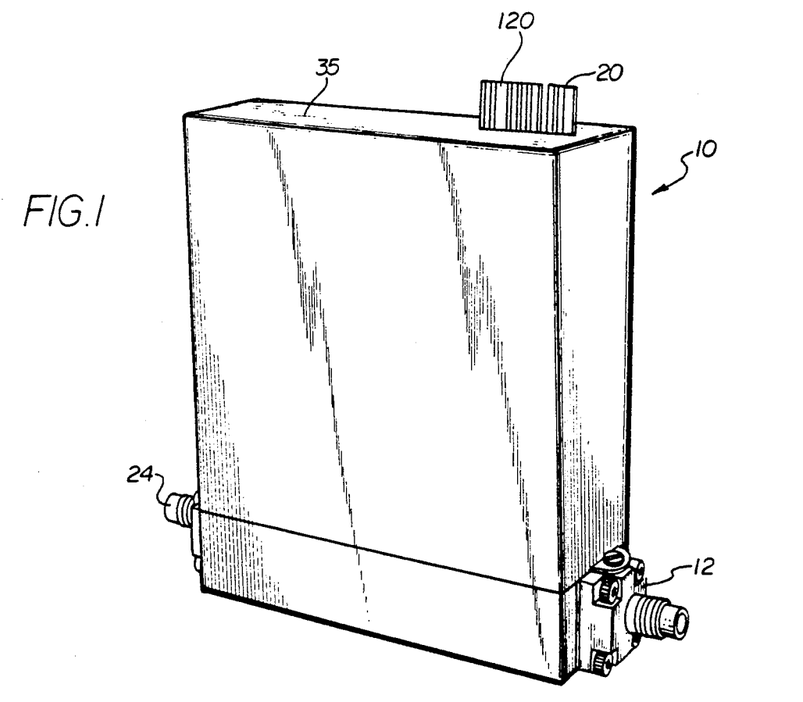
FIG. 1 is a perspective view of a liquid flow controller embodying the present invention.

Referring now to the drawing and especially to FIG. 1, a liquid flow controller embodying the present invention is shown therein and generally identified by numeral 10. The liquid flow controller 10 includes an inlet 12 for receiving a flow of reactant liquid, such as silicon tetrachloride or TEOS, from a suitable source. A laminar high resistance fluid flow path 14 is connected to the inlet 12. A means for measuring a pressure drop across the high resistance fluid flow path 14 comprises a pressure transducer 16. The pressure transducer 16 develops a liquid pressure drop signal in response to the flow-induced pressure drop. A means for compensating for changes in viscosity of the liquid includes means for measuring temperature of the high resistance fluid flow path, comprising a 10K PTC thermistor 18, is in good thermal contact with the coiled tube 14 and thus the liquid therein. The thermistor 18 produces a liquid temperature signal which is indicative of the viscosity of the liquid. An electronic circuit 20 receives the liquid pressure drop signal and the liquid temperature signal and produces a viscosity-normalized liquid flow signal. The viscosity-normalized liquid flow signal is compared to a liquid flow set point signal by the electronic circuit 20. The electronic circuit 20 produces an error signal which is sent to a means for modulating the flow of liquid, in this case a valve 22, which modulates the flow of liquid through the liquid flow controller 10. A liquid outlet 24 receives the metered liquid stream from the valve 22. The liquid flows at about 0.10 to 1.00 grams per minute.

Figure 2:
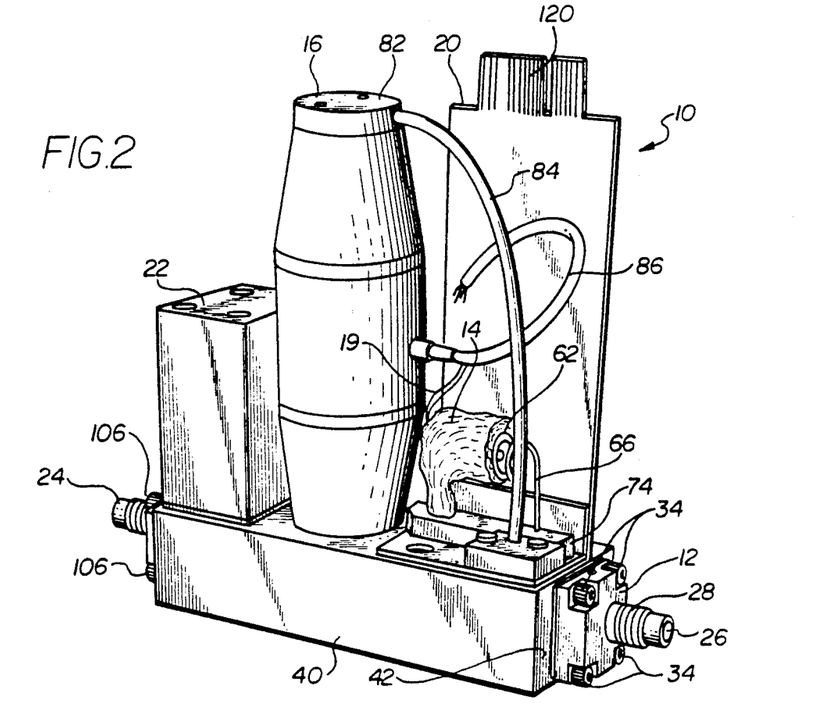
FIG. 2 is a perspective view of a liquid flow controller having a covering canister removed and having portions broken away to show details thereof.
Figure 3:
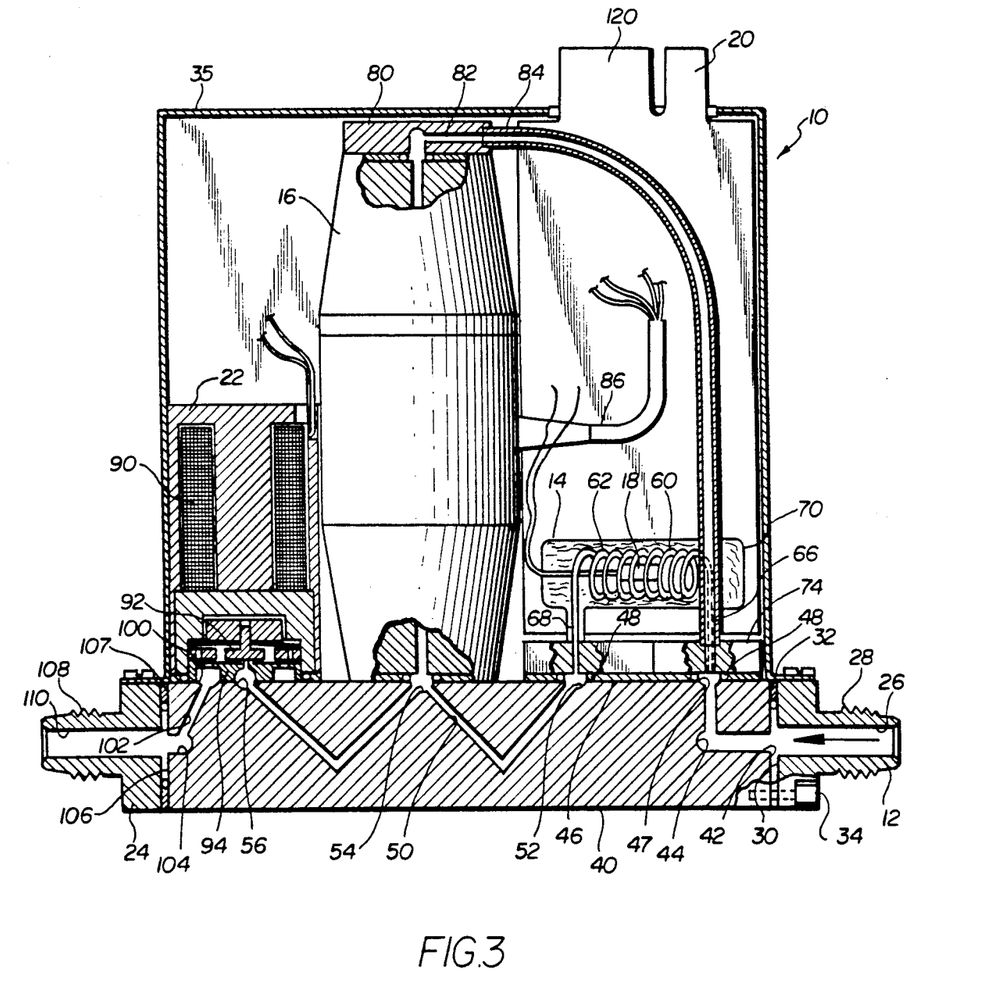
FIG. 3 is a side elevational view of a liquid flow controller with portions shown in section to show details thereof.

Referring now especially to FIGS. 2 and 3, details of the liquid flow controller 10 are shown therein. Reactant liquid such as SiCl4 or TEOS enters through the inlet 12, which comprises a unitary inlet defining an inlet bore 26 through which the liquid flows. The inlet 12 includes a threaded section 28 for coupling with a threaded fastener such as a Cajon fastener and ends in a substantially flat face 30 which engages a metal seal gasket 32. The inlet 12 includes a plurality of attachment bolts 34 for attaching the inlet 12 to a body block 40 of the liquid flow controller 10. A canister 35 is connected to the inlet 12. The body block 40 terminates in an inlet face 42 which meets with the metal seal gasket 32 in sealing fashion. An inlet passage or flow channel 44 is defined in the body block 40 and terminates at a face 46 of the body block 40 upon a portion of which is a metal gasket 48. The body block 40 includes a second channel 50 extending therethrough in a substantially W-shaped configuration with a plurality of ports 52, 54 and 56 defined therein.

Ports 47 and 52 are in communication with the high resistance liquid flow path element 14 and more specifically are in direct fluid communication with a metal tube 60 comprising the flow path 14 and having a helical portion 62, an inlet leg 66 connected to the helical portion 62 and an outlet leg 68 also connected to the helical portion. The metal tube 60 has an inside diameter of 0.013 inch and a length of 24 inches, although it may also be 12 inches long. The tube 60 only allows laminar flow through itself. The inlet leg 66 is in liquid communication with the port 47, the outlet leg 68 is in liquid communication with the port 52. The helical portion 62 is substantially surrounded by a fibrous batting material 70 to thermally isolate the helical portion 62 from the ambient temperature. The helical coil 62 is also in good thermal contact with the thermistor 18 to allow the thermistor 18 to reflect the temperature of the liquid flowing through the helically wound portion 62. The inlet leg 66 and the outlet leg 68 extend into a mounting block 74 which is positioned above the gasket 48 in sealing attachment therewith.

Liquid flows through the high resistance flow path 14 and then into the port 52 and through channel 50 to the port 54 where the liquid is made available to the pressure transducer 16, which comprises a Druck model PDCR-120/2 WL pressure transducer. One side of the pressure transducer 16 is connected to the port 54, the other side of the pressure transducer 16 is connected through a top cap 80 having a fluid passage 82 therein to a pressure transmitting tube 84. The pressure transmitting tube 84 is connected to the inlet port 47 to measure the pressure at the inlet of the high resistance liquid flow path 14. Thus, the pressure transducer 16 measures the pressure drop across the high resistance liquid flow path 14. Signals from the pressure transducer 16 are provided via a cable 86 to the electronic circuit board 20 where they are processed. Liquid then continues flowing from the port 54 through the channel 50 to the port 56, which port 56 has seated above it, the valve 22. The valve 22 is an electromagnetic valve of conventional type which is normally closed and is commonly sold in Unit Instrument, Inc's thermal mass flow controllers. The valve 22 includes a solenoid 90 which is energized by the electronic circuit 20. The solenoid 90 controls the position of a throttling element 92 positioned above a valve seat 94 to control the fluid or liquid flow out of the seat 56 and through the valve 22. When the valve 22 is opened, liquid flows through the valve 22 and into an exhaust seat 100 formed in the base block 40 and then through a passage 102 and out an exhaust port 104 of the base block 40. The outlet 24 is connected to the base block 40 at a substantially flat block face 106. The outlet 24 is attached by a plurality of threaded fasteners 106, as is the inlet 12. The outlet 24 includes a metal seal 107, a threaded portion 108 and a liquid transmitting bore 110 formed therein. Liquid flows out of the outlet 24 through the bore 110 and is delivered to the process chamber or other downstream processing apparatus from the liquid flow controller 10. It may be appreciated that the metal seal 107 provides clean, secure sealing for the liquid flow controller outlet.

Figure 4:
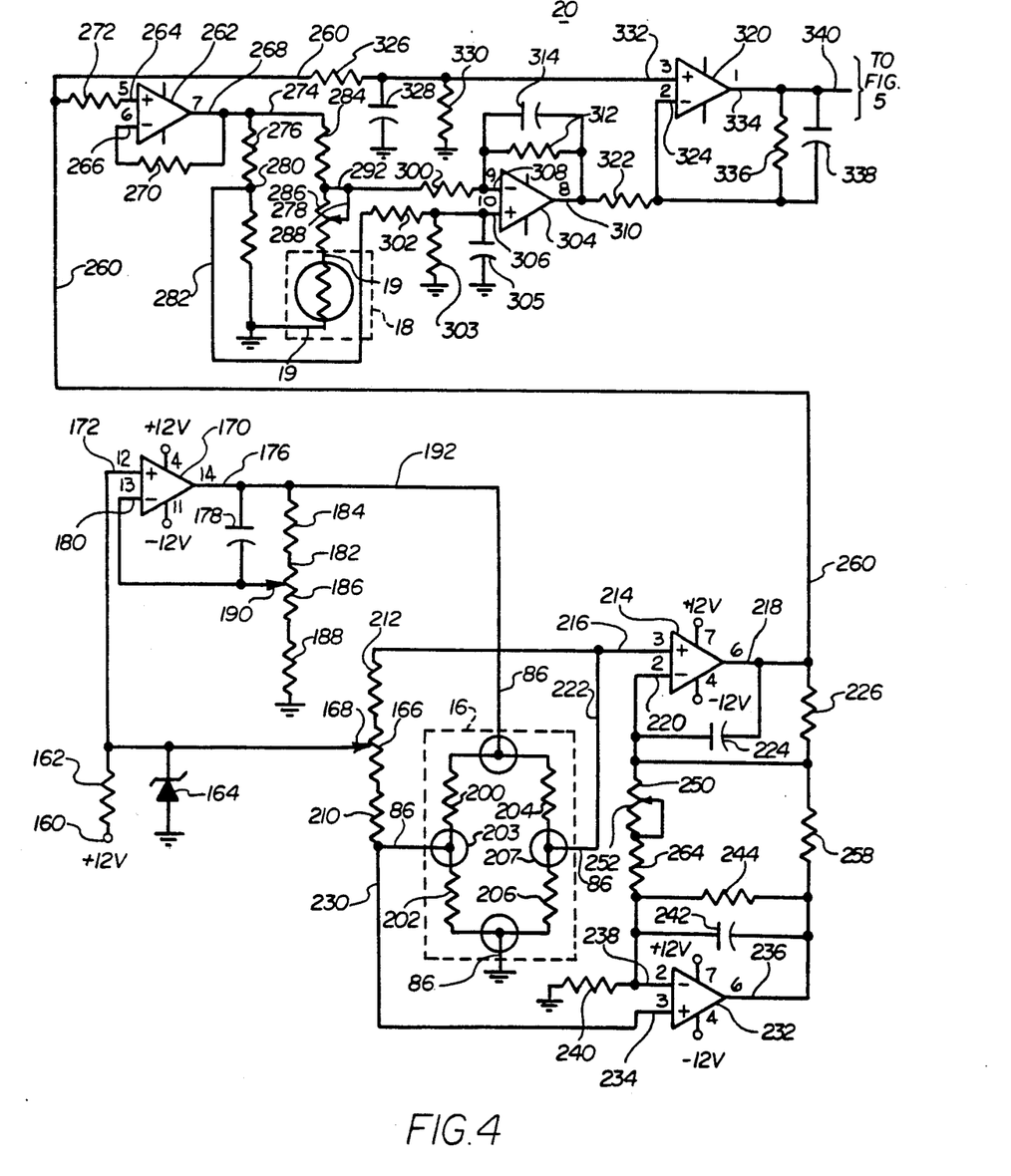
FIG. 4 is a schematic diagram of a pressure drop signal processing portion of an electronic control circuit of a liquid flow controller.
Figure 5:
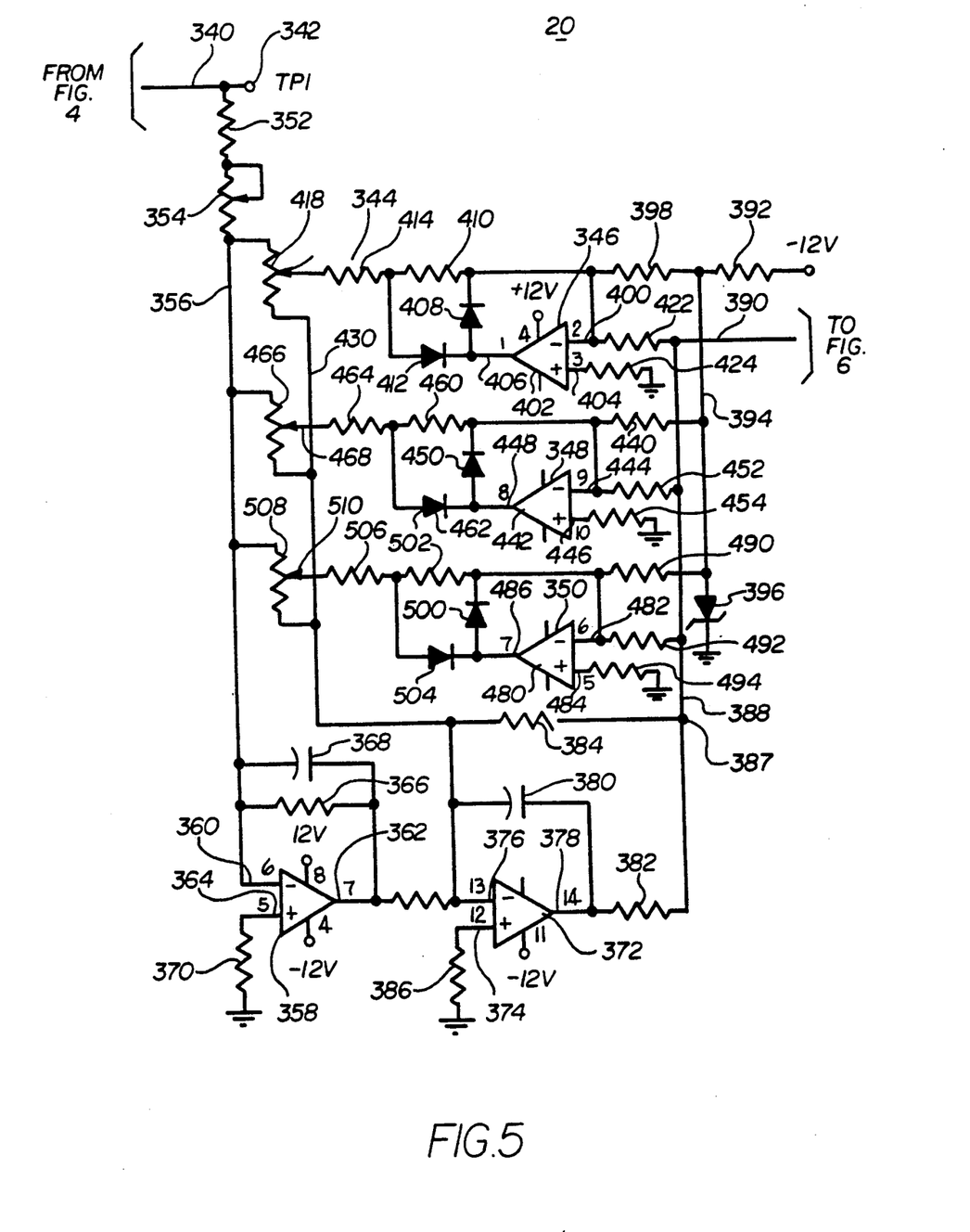
FIG. 5 is a schematic diagram of a linearizing portion of the electronic circuit of the liquid flow controller.
Figure 6:
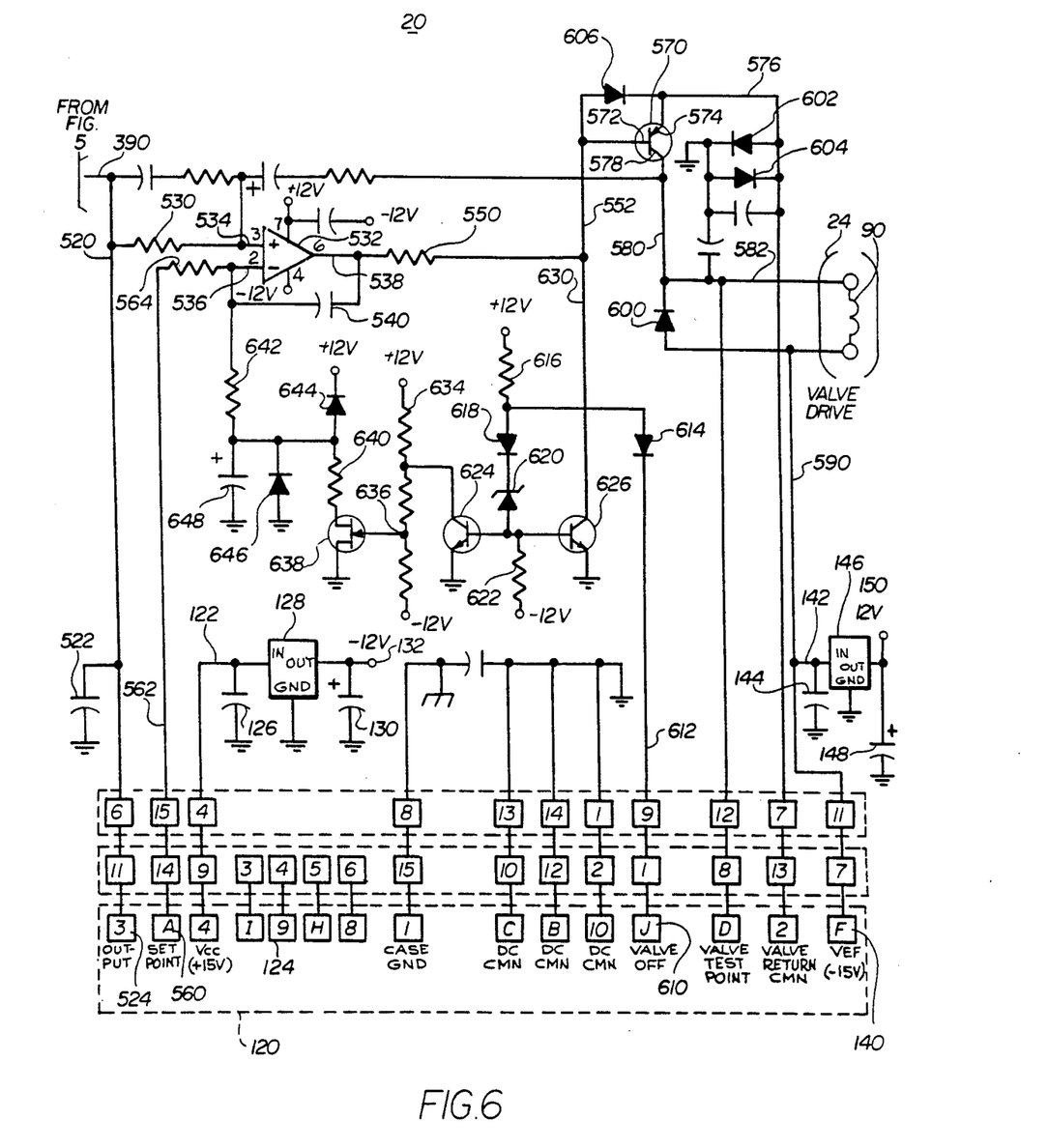
FIG. 6 is a comparator and valve control portion of the electronic circuit of the instant liquid flow controller.

Referring to FIGS. 4, 5 and 6, and in particular FIG. 6, the electronic circuit is shown therein as well as the schematic showing of the pressure transducer 16 and the thermistor 18. The liquid flow controller 10 includes a multiple pin connector port 120 through which power, set point signals and the like are provided. A positive 12 volt supply 122 is connected to be energized from a 15 volt pin 124 and includes a grounded filter capacitor 126, a voltage regulator 128 connected to the grounded filter capacitor 126 and a grounded electrolytic capacitor 130 for developing a positive 12 volt regulated potential at a node 132. Similarly, a voltage input pin 140 supplies a voltage regulator system 142 having a grounded capacitor 144 connected to an input of a voltage regulator 146. An electrolytic grounded capacitor 148 is connected to the output of the voltage regulator and a negative 12 volt regulated potential is available at a node 150. Both of these regulated potentials are supplied to other portions of the circuit.

Referring now to FIG. 4, the positive 12 volt potential from the node 132 is supplied to a node 160 to which is connected a resistor 162. A zener diode 164, which is grounded, is connected to the resistor 162 and to a potentiometer 166 at its sweep arm 168. The zener diode 164 is also connected to an amplifier 170 at its non-inverting terminal 172. The amplifier 170 has an output terminal 176 with a capacitor 178 connected in a feedback loop to an inverting input terminal 180.

A voltage divider 182 comprising a resistor 184, a potentiometer 186 and a resistor 188, is connected from the output of the amplifier 170 to ground. A sweep arm 190 of the potentiometer 186 is connected to the capacitor 178 and to the inverting input terminal 180 to select the effective gain of the amplifier 170 and thereby control the controlled voltage output supplied via a line 192 to the pressure transducer 16. The set point of the amplifier 170 may also be adjusted by moving the sweep arm 168. Regulated voltage is thus supplied to the pressure transducer 16. The pressure transducer 16 includes four strain gauges connected in a bridge and respectively numbered 200, 202, 204 and 206. The junction of strain gauges 200 and 204 is energized by the lead 192. Strain gauges 202 and 206 are grounded. A node 203 between strain gauges 200 and 202 is connected to a resistor 210 connected to the potentiometer 166. The potentiometer 166 is also connected to a resistor 212 which feeds a signal to an input terminal of an amplifier 214. More specifically, the signal is fed to a non-inverting input terminal 216. The amplifier 214 also has an output terminal 218 and an inverting input terminal 220. A signal from a node 207 between the resistors 204 and 206 is fed via a lead 222 to the non-inverting input terminal 216 of the amplifier 214. The amplifier 214 has a capacitor 224 connected in the feedback loop from the output terminal 218 to the inverting input terminal 220. A resistor 226 is connected in parallel with the capacitor 224. The signal from the strain gauge node 203 is received by a lead 230 connected to the resistor 210 and fed to an amplifier 232 at its non-inverting input terminal 234. The amplifier 232 also has an output terminal 236 and an inverting input terminal 238. The inverting input terminal 238 is connected through a resistor 240 to ground. A capacitor 242 is connected in a feedback loop between the output terminal 236 and the input inverting terminal 238. A resistor 244 is connected parallel with the capacitor 242 in the same feedback loop. A voltage divider 250, including a potentiometer 252 connected as a rheostat and a resistor 254, is connected between the inverting input terminals 220 and 238 of amplifiers 214 and 232, respectively to provide a span adjustment. A resistor 258 is connected between the output terminal of the amplifier 232 and the resistor 226. The amplifiers 214 and 232 are driven in parallel by the output of the pressure transducer bridge to provide sufficient current drive at a lead 260 for further signal processing. When a differential pressure due to flow is developed, the bridge is unbalanced causing a difference in the voltages between the nodes 203 and 207 thereby driving the amplifiers 214 and 232 and providing a single-ended output signal on the lead 260. The output signal is the pressure drop or liquid flow signal.

The means for compensating for the viscosity-related changes in the liquid flow signal receives the pressure differential signal on line 260 at an amplifier 262. More specifically, the amplifier 262 has a non-inverting input terminal 264, an inverting input terminal 266 and an output terminal 268 with a feedback resistor 270 connected between output terminal 268 and inverting input terminal 266. An input resistor 272 is connected to the lead 260 to receive the liquid flow signal therefrom. The amplifier 262 acts as a buffer amplifier to provide current drive to a viscosity sensing bridge 274. The bridge 274 comprises a resistor 276, a resistor 278. The resistor 278 is grounded. A node 280 between the resistors 276 and 278 has a lead 282 connected to it to produce a bridge signal. The resistors 276, 278 and the node 280 comprise a first leg of the bridge. The bridge has a second leg comprising a resistor 284 connected to the output terminal 268 of the amplifier 262. A potentiometer 286 is connected to the resistor 284 and has a sweep arm 288. The thermistor 18 is connected via leads 19 to the potentiometer 286 and to ground. A lead 292 extends from the junction of the resistors 284 and the potentiometer 286. The sweep arm 288 is connected to the lead 292 and feeds the signal to a resistor. Similarly, the lead 282 is connected to a resistor 302. Resistors 300 and 302 are part of a differential amplifier 304 comprising an operational amplifier having a non-inverting terminal 306 and inverting input 308 and an output terminal 310. A grounded resistor 303 and capacitor 305 are connected to the input terminal 306. A resistor 312 is connected in a feedback loop from the output terminal 310 to the inverting terminal 308. A capacitor 314 is connected in parallel with the resistor 312.

As the temperature of the liquid flowing through the high resistance flow path 14 changes, the electrical resistance of the thermistor 290 changes causing a change in the voltage difference between leads 282 and 292. The voltage difference is fed to the differential amplifier 304 where it is amplified. It may be appreciated that since the bridge is energized by a signal proportional to the liquid flow signal, the gain of the bridge and differential amplifier combination is effectively controlled by the magnitude of the liquid flow signal. Thus, the response of the thermistor 18 is modified by the liquid flow signal in conformity therewith. The differential amplifier 304 produces an output signal at its output terminal 310 which is responsive to the temperature dependent viscosity of the liquid flowing through the high resistance flow path 14.

The output signal is supplied to a differential amplifier 320 via a resistor 322 connected to an inverting input terminal 324 of the amplifier 320. The differential amplifier 320 also includes an input resistor 326 receiving the unmodified liquid flow signal from the lead 260. A capacitor 328 and a resistor 330 are connected between the resistor 326 and ground. The resistor 326 is also connected to an inverting input terminal 332 of the differential amplifier 320. The differential amplifier 320 has an output terminal 334 with a resistor 336 and capacitor 338 connected in parallel in a feedback loop from the output terminal 334 to the inverting input terminal 324. The differential amplifier 320 develops a viscosity normalized or compensated liquid flow signal at an output lead 340, which signal is used to control other portions of the circuitry.

As may be seen in FIG. 5, the viscosity compensated liquid flow signal is fed to a test point 342 and to a linearizing circuit 344 of the type conventionally used in thermal mass flow controllers sold by Unit Instruments, Inc. The linearizing circuit 344 includes a plurality of segment generators, respectively numbered 346, 348 and 350 for providing variable gain with break points at 25 percent, 50 percent and 75 percent flow levels to linearize the viscosity compensated liquid flow signal.

The compensated flow signal on line 340 is also fed to a resistor 352 which is connected to a potentiometer 354. A line 356 is connected to the potentiometer 354. The viscosity compensated liquid flow signal is then fed to an inverting amplifier 358 at an inverting input terminal 360. The inverting amplifier 358 has an output terminal 362 and a non-inverting input terminal 364. A resistor 366 and a parallel capacitor 368 are connected between the inverting input terminal 360 and the output terminal 362. A grounded resistor 370 is connected to the non-inverting input terminal 364.

A second inverting amplifier 372 having a non-inverting input terminal 374, an inverting input terminal 376 and an output terminal 378 has a capacitor 380 connected in a feedback loop. A pair of resistors 382 and 384 are also connected in the feedback loop. A resistor 386 is connected between the non-inverting input terminal and ground. The signal fed from line 356 is inverted and amplified in the amplifier 358 and further inverted and amplified in the amplifier 372 and fed through resistor 382 to an output node 387 between the resistors 382 and 384. Node 387 is connected to a line 388 which is connected to each of the segment generators 346, 348 and 350. This line 388 is connected to an output line 390 upon which is developed a linearized compensated liquid flow signal.

The line segment generator 346 is driven from a negative 12 volt source through a resistor 392 which is connected to a line 394. A grounded zener diode 396 is connected to the line 394 so that a regulated negative voltage is provided at the line 394. A resistor 398 is connected to receive that regulated voltage from the resistor 392 and feeds it to an inverting input terminal 400 of the line segment generator 346. The inverting input terminal 400 is an input terminal of an amplifier 402 which also has a non-inverting input terminal 404 and an output terminal 406. A diode 408 is connected in a feedback loop from the output terminal 406 to the inverting input terminal 400. A feedback resistor 410 is connected to the diode 406 and a reverse poled diode 412 is connected between the resistor 410 and the diode 408. An output resistor 414 is connected to the diode 412 and the resistor 410 and to a potentiometer 416 at its sweep arm 420. Also connected to the input of the amplifier 402 is an input resistor 422 which receives the signal from the line 388 and feeds that signal to the inverting terminal 400. A grounded resistor 424 is connected to the non-inverting input terminal 404. The line segment generator 346 operates as a amplifier to amplify the viscosity compensated liquid flow signal when a 25 percent flow rate is reached. The 25 percent level causes the diode 408 to become reversed-biased, switching the resistor 410 effectively into the feedback circuit and causing the amplifier 346 to develop an output signal or current which is fed through the resistor 414 to the potentiometer 418. A portion of the output current is fed to the line 356 and the remaining portion of the output current is fed to a line 430. The line 430 is connected to the non-inverting input terminal 376 of the inverting amplifier 372. Thus, the setting of the potentiometer 418 determines how much of the current is fed to the first inverting amplifier 358 and how much is fed to the second inverting amplifier 372.

Similarly, an input resistor 440 is connected to the line 394 to drive an amplifier 442 at an inverting input terminal 444. The amplifier 442 also has a non-inverting input terminal 446 and an output terminal 448. A diode 450 is connected between the output terminal 448 and the inverting input terminal 444. An input resistor 452 is connected from the line 388 to inverting terminal 444. A grounded resistor 454 is connected to the non-inverting terminal 446. A feedback resistor 460 is connected to the diode 450. A diode 462 is connected from the feedback resistor 460 to the output terminal 448. An output resistor 464 is connected from the junction of the resistor 460 and the diode 462 to a potentiometer 466 at its sweep arm 468. The potentiometer 466 is connected to the lead 356 and to the lead 430. The line segment generator 348 works similarly to the line segment generator 346 with the exception that it switches at a 50 percent flow level to provide an output signal. The effect of the output signal is controlled by the sweep arm setting 468 which splits the signal between the inverting amplifiers 358 and 372.

The line segment generator 350 is substantially identical to the line segment generators 346 and 348 with the exception that it switches at the 75 percent flow level. It includes an amplifier 480 having an inverting input terminal 482, a non-inverting input terminal 484 and an output terminal 486. The inverting input terminal 482 is coupled through a resistor 490 to the lead 394 to receive the regulated biased voltage. It is coupled through a parallel resistor 492 to the lead 388 to receive the output signal from the amplifier 372. A resistor 494 is connected to the non-inverting input terminal 484 and is grounded. A diode 500 is connected from the output terminal 486 to the inverting input terminal 482. A resistor 502 is connected to the diode 500 and to a diode 504 which is also connected to the output terminal 486. An output resistor 506 is connected to the junction of the resistor 502 and the diode 504 and to a potentiometer 508 at its sweep arm 510. Potentiometer 508 has one end connected to the line 356 and the other end connected to the line 430. In operation, once the 75 percent flow signal level is exceeded, diode 500 blocks and diode 504 becomes conductive caused by the voltage change from the positive region to the negative region at output terminal 486, thereby effectively connecting the resistor 502 in the feedback loop. The amplifier 480 then provides an output signal through the resistor 506 to the potentiometer 508 which signal is then split and fed on a proportional basis, according to the position of sweep arm 510, to amplifiers 358 and 372. The amplifier output signal is then fed back and out through the resistor 382 to the output line 390 as a linearized viscosity compensated liquid flow signal.

Referring now to FIG. 6, the linearized viscosity compensated liquid flow signal is fed from the line 390 to an output line 520. The output line 520 has a capacitor 522 connected to it and to ground to remove transients from the signal and feeds an output terminal 524 on the connector 120. This output signal is available to a controller such as a direct digital controller which may control the liquid flow controller 10. The signal at line 520 also is fed to a resistor 530 connected to a set point comparing amplifier 532 at a non-inverting terminal 534. The amplifier 532 also has an inverting terminal 536 and an output terminal 538. A capacitor 540 is connected from the output terminal 538 to the non-inverting terminal 536. A resistor 550 is connected from the output terminal 538 to a line 552 on which a valve driver signal is developed. A set point signal is received at a terminal 560 which is part of the input connector ribbon 520. The signal is fed to a lead 562 which is connected to a resistor 564 which feeds the signal to the inverting terminal 536. Thus, the set point signal and the linearized viscosity compensated liquid flow signal are received by the amplifier 532. The amplifier 532 functions effectively as an integrating type comparing amplifier and produces an output error signal at line 552. The error signal is a valve control signal which is fed to a transistor 570 at its base 572. An emitter 574 is connected to a valve return path 576. A collector 578 is connected via a line 580 to a line 582 which is connected to the solenoid 90 of the valve 22. The other side of the solenoid 90 is connected to a line 590 which is driven from the negative volt 15 volt signal on the pin 140. Various protective diodes such as diodes 600, 602 and 604 as well as 606 are placed in the circuit to protect against transients due to changes in the magnetic field through the solenoid 90 as the valve 22 is controlled.

An input pin 610, commonly known in the industry as pin J, is connected to a line 612 which controls the state of a diode 614. Diode 614 is connected to a resistor 616 driven from a positive 12 volt source. A diode 618 is connected to the junction of resistor 616 and diodes 614 and a zener diode 620 is connected to the diode 618. A resistor 622 is connected between the zener diode 620 and the negative 12 volt source so that at the junction a regulated voltage is supplied, which voltage may be effectively changed by the signal at pin 610. A pair of transistors 624 and 626 are thus controlled by the electrical state at pin 610. If pin 610 is pulled low, the transistors 624 and 626 are switched on. Transistor 626 is connected through a line 630 to the base 572 of the transistor 570 via lead 552 and thus will effectively cut off the current to the solenoid 90. In addition, the transistor 624 is connected to a voltage divider 634 to bias a junction 636 of the voltage divider 634 to control a field effect transistor 638 connected thereto. The field effect transistor 638 is connected through a resistor 640 to a resistor 642 connected to the non-inverting terminal 536. A diode 644 is connected to the resistor 640. A grounded diode 646 is likewise connected as is an electrolytic capacitor 648. The control effected through the field effect transistor 638 will effectively pull the input terminal 536 of the amplifier 532 to ground preventing the set point signal from providing any drive to the differential amplifier 532.

It may thus be appreciated that the instant liquid flow controller 10 solves several problems previously encountered in the art. The controller 10 is rapidly responsive due to its pressure transducer 16 but at the same time is not subject to perturbations caused by viscosity changes in the liquid as the temperature of the liquid varies. The viscosity compensated signal is further linearized by a segment linearizer to provide a linearized compensated signal for accurately driving the valve 22 to accurately meter a reactant such as silicon tetrachloride, tetraethoxysilane or the like to a process chamber of equipment for producing a semiconductor device.

While there have been illustrated and described particular embodiments of the present invention, it will be appreciated the numerous changes and modifications will occur to those skilled in the art which fall within the true spirit and scope of the present invention.

What is claimed is:

1. A liquid flow controller for metering a flow of liquid comprising:
   a liquid inlet for receiving the flow of liquid;
   means coupled to said liquid inlet to receive the flow of liquid for providing a high resistance liquid flow path and for producing a laminar flow of liquid;
   means for measuring a pressure drop across the high resistance liquid flow path means, the pressure drop resulting from the flow of liquid and for producing a liquid pressure drop signal in response to the pressure drop;
   means for compensating for changes in the viscosity of the liquid and for producing a compensated liquid pressure drop signal in response thereto;
   a valve connected to receive the flow of liquid from said high resistance liquid flow path means, said valve responding to the compensated liquid pressure drop signal; and
   a liquid outlet connected to said valve for providing a metered flow of the liquid.

2. A liquid flow controller for metering a flow of liquid as defined in claim 1 wherein said means for compensating for viscosity changes in the liquid further comprises means for measuring a temperature of the liquid.

3. A liquid flow controller for metering a flow of liquid as defined in claim 2 wherein said means for measuring the temperature of the liquid measures the temperature of the liquid in said high resistance liquid flow path means.

4. A liquid flow controller for metering a flow of liquid as defined in claim 2 wherein said compensating means receives the liquid pressure drop signal and controls the gain of said temperature measuring means.

5. A liquid flow controller for metering a flow of liquid as defined in claim 4 wherein said temperature measuring means comprises a bridge having a pair of legs and having a temperature dependent device in one of the legs.

6. A liquid flow controller for metering a flow of liquid, comprising:
- a liquid inlet receiving the flow of liquid;
- a high resistance liquid flow path connected to said liquid inlet to receive the flow of liquid;
- means for measuring a pressure drop across said high resistance liquid flow path resulting from the flow of liquid and for producing a liquid pressure drop signal in response to the pressure drop;
- means for measuring a temperature of said high resistance liquid flow path and producing a liquid temperature signal in response to the temperature;
- means for producing a viscosity-normalized liquid flow signal in response to the liquid pressure drop signals and the liquid temperature signal;
- means for modulating the flow of liquid in response to the viscosity-normalized liquid flow signal; and
- a liquid outlet connected to said modulating means for providing a metered flow of the liquid.

7. A liquid flow controller for metering a flow of liquid as defined in claim 6 further comprising means for thermally isolating said high resistance liquid flow path.

8. A liquid flow controller for metering a flow of liquid as defined in claim 7 wherein said high resistance liquid flow path comprises a helically wound tube.

9. A liquid flow controller for metering a flow of liquid as defined in claim 6 wherein said viscosity-compensating means receives the liquid pressure drop signal and controls the gain of said temperature measuring means.

10. A liquid flow controller for metering a flow of liquid as defined in claim 9 wherein said temperature measuring means comprises a bridge having a pair of legs and having a temperature dependent device in one of the legs.

* * * * *